US005324559A

United States Patent [19]

Brombacher

[11] Patent Number: 5,324,559

[45] Date of Patent: Jun. 28, 1994

[54] BOOKLET LABEL AND METHOD FOR MAKING THE SAME

[75] Inventor: Kurt M. Brombacher, Richmond, Calif.

[73] Assignee: Independent Printing Company, Inc., Marginez, Calif.

[21] Appl. No.: 167,627

[22] Filed: Dec. 14, 1993

Related U.S. Application Data

[63] Continuation of Ser. No. 964,663, Oct. 22, 1993, abandoned.

[51] Int. Cl.[5] ........ B32B 9/00

[52] U.S. Cl. ........ 428/40; 428/41; 428/42; 428/43; 428/131; 428/137; 428/195; 156/204; 156/227; 156/260; 283/56; 283/81

[58] Field of Search ........ 428/40, 41, 42, 43, 428/131, 137, 195, 198; 156/204, 227, 260, 247; 283/56, 81

[56] References Cited

U.S. PATENT DOCUMENTS 3,916,051 10/1975 Wakeman ........ 428/40
4,323,608 4/1982 Denny et al. ........ 428/43
4,479,838 10/1984 Dunsirn et al. ........ 156/247
4,592,572 6/1986 Instance ........ 281/2
4,675,062 6/1987 Instance ........ 156/227
4,680,080 7/1987 Instance ........ 156/357
5,021,273 6/1991 Kobayashi ........ 428/40
5,127,676 7/1992 Bockairo ........ 283/81

*Primary Examiner*—Patrick J. Ryan
*Assistant Examiner*—Abraham Bahta
*Attorney, Agent, or Firm*—Flehr, Hohbach, Test, Albritton & Herbert

[57] ABSTRACT

A booklet label adapted to be fixed to a container and having a spine. A plurality of sheets are provided which are folded along a fold line and permanently secured together along the fold line to form the spine. The first and last sheets have a length greater than the other sheets and the last sheet has a length greater than the first sheet. A resealable glue not disposed between the first and last sheets and beyond the other sheets for bonding the first sheet to the second sheet for holding the booklet in a closed position but permitting the booklet label to be reopened.

8 Claims, 3 Drawing Sheets

BOOKLET LABEL AND METHOD FOR MAKING THE SAME

This is a continuation of application Ser. No. 07/964,663 filed Oct. 22, 1993, now abandoned.

This invention relates to a booklet label and method for making the same.

With the advent of government regulations requiring use of additional printed matter to provide the desired information, it has been necessary to utilized multiple-page labels. Certain attempts have been made to meet these needs by the use of pressure-sensitive labels. However, it has been found that such pressure-sensitive labels require expensive materials and customized machinery for producing the same. There is therefore a need for a less expensive label which will meet the labeling requirements of government regulations and which still can make use of a paper label that can be produced with conventional machinery.

In general it is an object of the present invention to provide a booklet label and method for making the same which can use a paper label.

Another object of the invention is to provide a booklet label and method of the above character which can be manufactured with conventional machinery.

Another object of the invention is to provide a booklet label and method of the above character which is particularly adapted for shorter runs of labels.

Another object of the invention is to provide a booklet label and method of the above character which is resealable.

Another object of the invention is to provide a booklet label and method of the above character which is less expensive.

Additional features and objects of the invention will appear from the following description in which the preferred embodiment is set forth in conjunction with the accompanying drawings.

In general, the booklet label of the present invention is adapted to be adhered to a container. It is comprised of a plurality of sheets which are folded along a fold line. Means is provided for permanently securing the sheets together along the fold lines to form the spine of the booklet. The first and last sheets have a length greater than the other sheets. The last sheet has a length greater than the first sheet. Resealable means is disposed between the first and last sheets beyond the other sheets and bonds the first sheet to the second sheet for holding the booklet label in a closed position.

Figure 1:
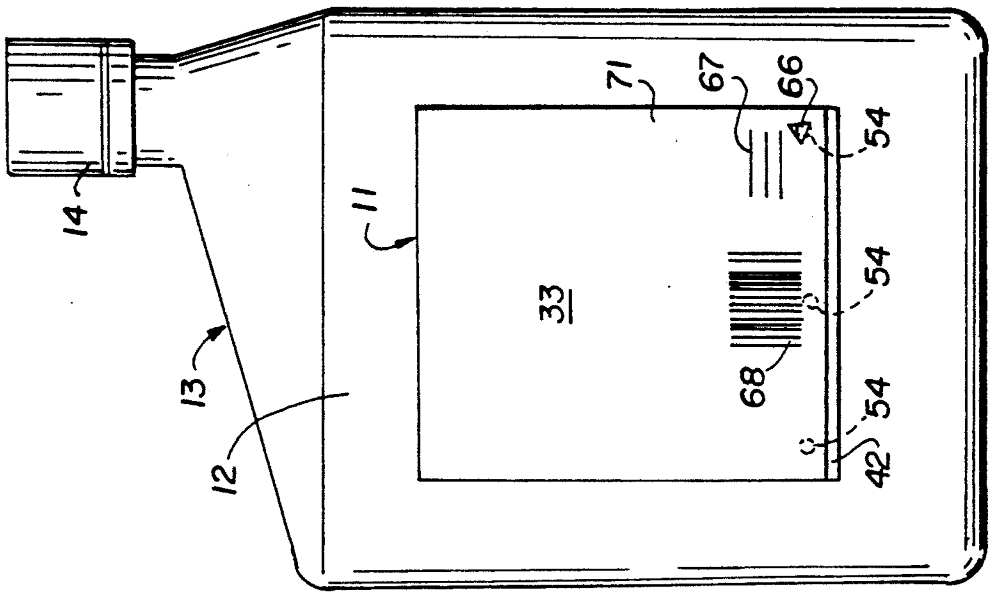
FIG. 1 is a side elevational view of the plastic container or bottle having a booklet label incorporating the present invention mounted on the back side thereof.

More in particular, as shown in FIG. 1, the booklet label 11 incorporating the present invention is secured to the back side 12 of a conventional bottle or container 13 having a removable cap 14 thereon. The container 13 can be formed of a suitable material such as plastic.

The booklet label 11 is formed from a rectangular sheet 21 of paper. This sheet 21 of paper can be cut from a larger sheet (not shown), as for example a 23"×35" sheet of 60-lb glossy book paper. This sheet 21 is provided with first and second sides 22 and 23. Both sides of the sheet 21 are coated. As many as eight of the sheets 21 can be formed from the single 23"×35" sheet to make the booklet label of the present invention. Each of the first and second sides 22 and 23 of the sheet 21 have first, second, third and fourth quadrants with quadrants 26, 27, 28 and 29 being on the first side 22, and quadrants 31, 32, 33 and 34) being on the second side 23. The sheet 21 is also provided with first and second spaced apart parallel edges 36 and 37, and third and fourth spaced apart parallel edges 38 and 39 which extend at right angles to the first and second parallel edges 36 and 37.

In connection with the present invention, both sides of the sheet 21 have printing provided thereon which is arranged in the four quadrants so that the printing can be read when the page is formed into booklet form as hereinafter described. In addition, one or more colors can be utilized in the printing. For example, a colored region rectangular 41 (see FIG. 3) of a suitable color, as for example yellow, can be provided on the second side 23 of the sheet 21 which extends over substantially all of the third quadrant 33 and partially into the first quadrant. Also, to provide a solid unitary color for the front side of the booklet label 11, another smaller colored rectangular region or stripe of the same color, as for example 11, 42 can be provided in the third quadrant 28 of the first side 22 (see FIG. 2).

Figure 2:
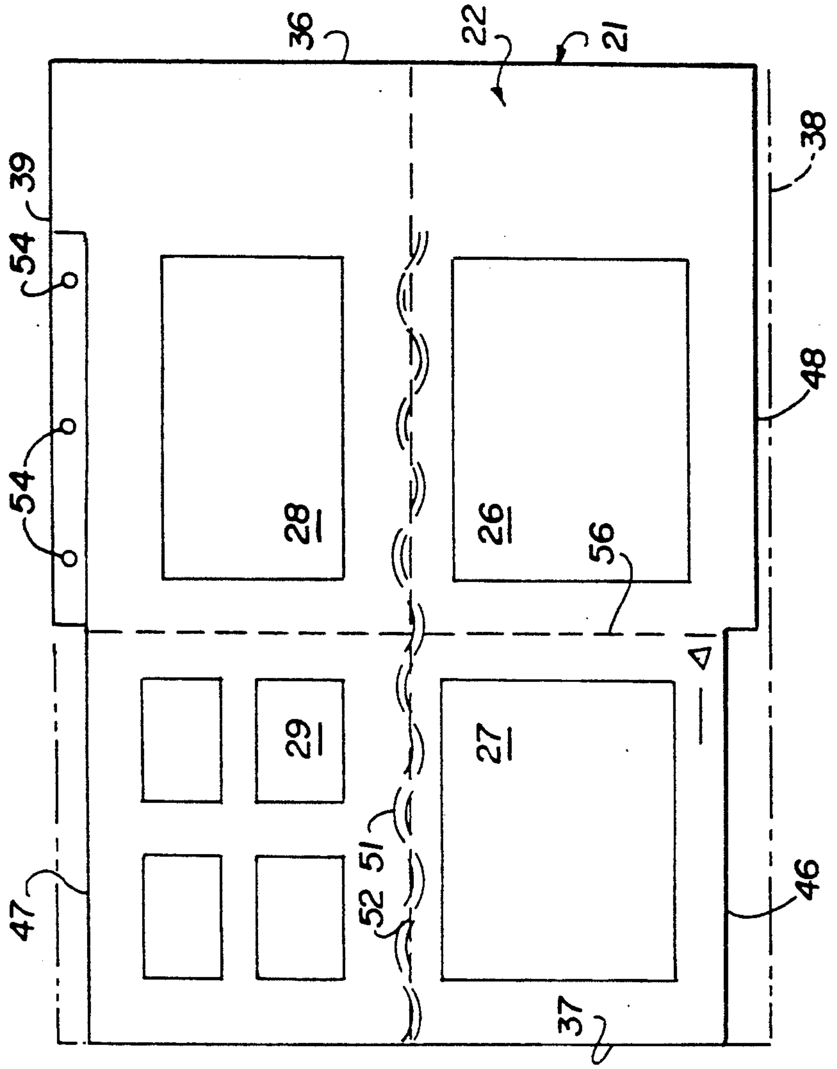
FIG. 2 is a top plan view of one side of a sheet of paper utilized for making the booklet label shown in FIG. 1.
Figure 3:
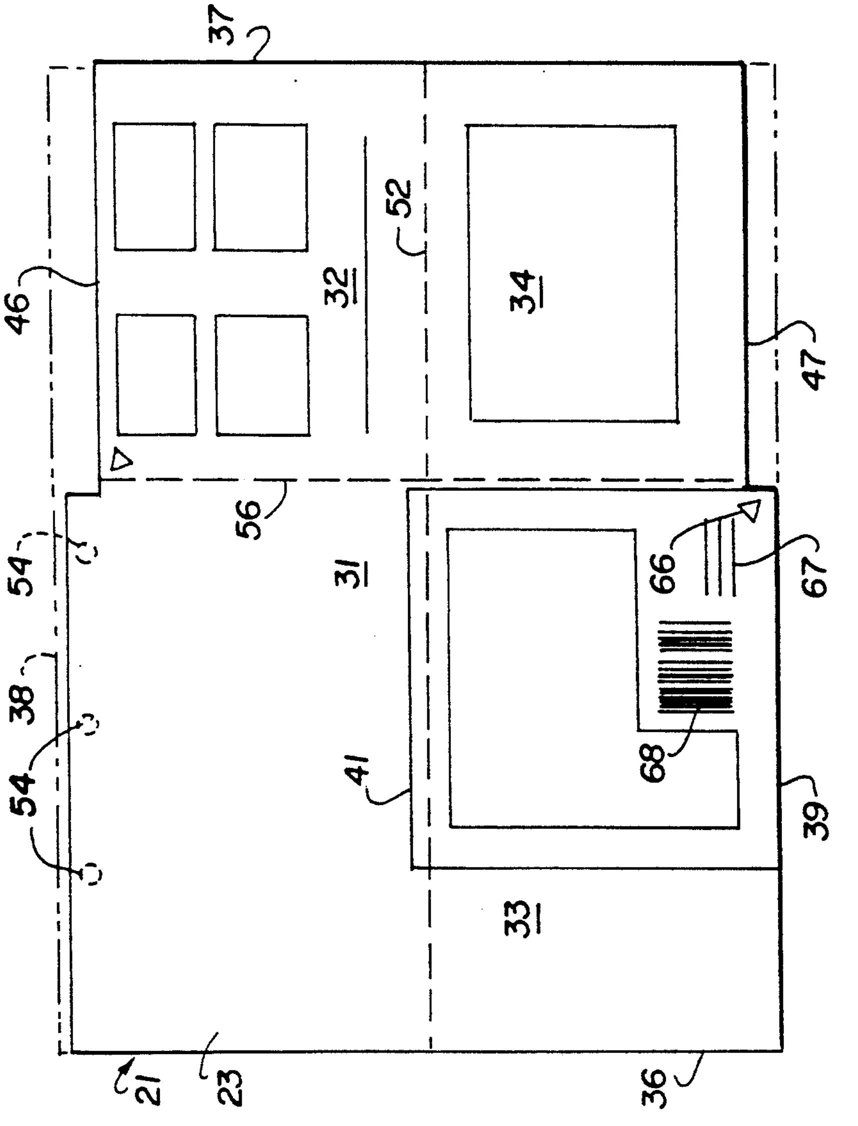
FIG. 3 is a top plan view of the other side of the sheet utilized for making the booklet label shown in FIG. 1.

After the desired printing has been accomplished at which time a varnish is applied to the colored areas 41 and 42, the sheet 21 can be die cut from the larger sheet (not shown) and the same time to provide first and second cutouts 46 and 47 in the sheet with the material being removed being represented by broken lines. Looking at the first side 22 of the sheet, the cutouts 46 and 47 extend inwardly from the third and fourth edges 38 and 39 and from the second edge 37 toward the first edge 36 and through and slightly beyond the second and fourth quadrants 27 and 29, as shown in FIGS. 2 and 3. A third cutout 48 is provided which is adjacent to the third edge 38 and extends from the cutout 46 to the first edge 36. Cutout 48 has depth which is substantially less than the depth of the cutout 46 (see FIG. 2). Alternatively, to eliminate the third cutout 48, the second cutout 46 can be made less deep to achieve the same result.

After the die cutting has been accomplished, glue is applied in appropriate locations on the first side 22 of the sheet 21. Two types of adhesive are used. A suitable permanent glue or adhesive such as Henkel No. W2558 is applied substantially continuously along a wavy glue line 51 which is generally equidistant between the edges 38 and 39 and generally overlies a fold line 52 which extends from the edge 36 to the edge 37. The fold line 52 is represented by a broken line 52. The permanent glue for glue line 51 is supplied by Henkel Adhesive Corporation, 25817 Clawitter Road, Hayward, Calif. 94545. A suitable releasable adhesive such as Henkel adhesive PR106TT is applied to the colored region 42. This resealable adhesive is applied in three spaced apart dots 54.

Figure 4:
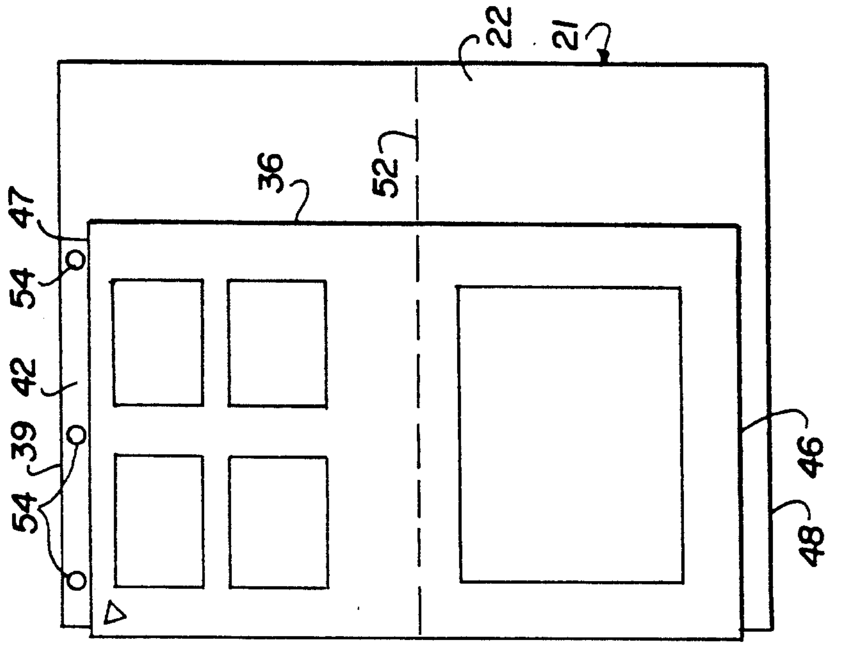
FIG. 4 is a top plan view of the sheet shown in FIGS. 2 and 3 after the first fold has been completed for making the booklet label.
Figure 5:
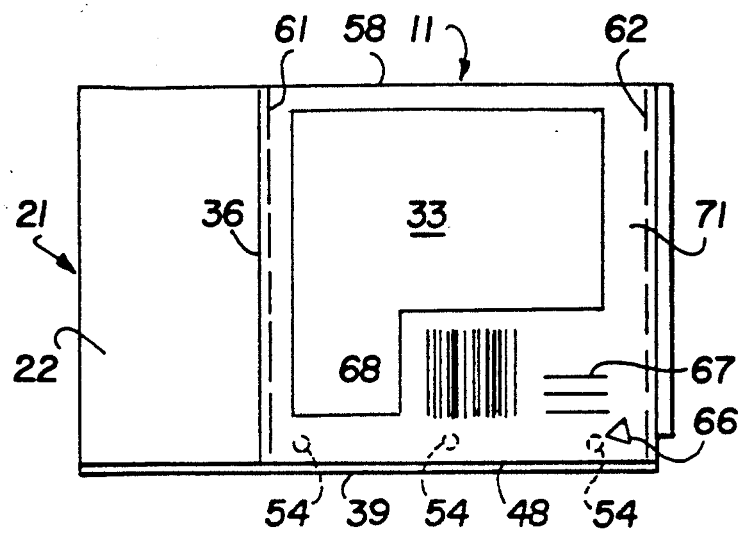
FIG. 5 is a top plan view of the sheet shown in FIGS. 2 and 3 after the second fold has been accomplished.

The permanent glue and the resealable glue can be applied in a buckle folder of a conventional type. After the permanent glue has been applied along the glue line 52, the buckle folder causes the sheet 21 to be folded along a fold line indicated by the broken line 56 extending from the edge 38 to the edge 39 so that the second and fourth quadrants 27 and 29 overlie the first and third quadrants 26 and 28 of the same side 22 to the configuration shown in FIG. 4 to cause the two overlapping portions of the permanent glue line 51 to bond together the folded one side 22. Thereafter, the dots 54 of resealable adhesive glue are applied by the use of a stepping glue head (not shown), after which the folding machine causes a fold to be formed along the fold line 52 in a direction generally perpendicular to the fold line 56 to cause the first and third quadrants 32 and 34 of the second side 23 to overlie each other to the configuration shown in FIG. 5 and to bring a portion of the first quadrant 26 of the first side 22 into engagement with the resealable glue dots carried by the third quadrant 28 of the first side 22. The folding along the fold line 56 creates the spine 58 for the booklet label.

Figure 6:
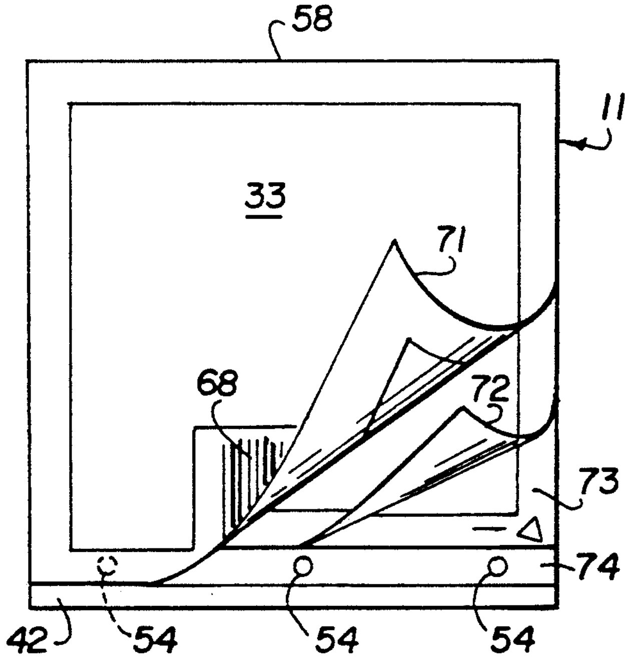
FIG. 6 is a front elevational view of the booklet label as shown in FIG. 1 being partially opened to show the pages in the booklet label.

After these folding operations have been completed, the folded sheet can be slit to cut it down to a suitable finish size, as for example 4×4" shown in FIG. 6. The slitting or trimming is accomplished along two parallel spaced apart broken lines lines 61 and 62, see FIG. 5 which are parallel to the edge 36, to trim off the excess material, and thereby finish the booklet. By cutting of the right-hand edge as viewed in FIG. 5 along the line 62, the portion of the sheet having the fold line 56 therein is cut off to permit the booklet to be opened.

The booklet label can then be stacked with other booklet labels and stored in this form until it is ready for use as for example by applying the same to a container or bottle 13. This can be accomplished in a conventional manner by applying glue to the back side of the booklet label 11 in the first quadrant 31 of the second side 23.

With the booklet label 11 formed in this manner, the second quadrant 33 of the label will be exposed with the entire exposed surface of the booklet label 11 showing the yellow color which includes a portion of the colored strip 42 provided on the third quadrant 28 of the first side 22.

An indicating arrow 66 can be provided on the lower extremity of the quadrant 33 with a suitable instruction, as for example "LIFT AT THIS EDGE TO OPEN. PRESS TO RESEAL." The lower right-hand corner can be provided with a barcode 68 as shown.

With the booklet label of the type hereinbefore described, the book has four pages 71, 72, 73 and 74, as shown in FIG. 6. Thus, pertinent text can be provided on both sides of pages 71, 72 and 73, and on one side of the page 74 to provide space for seven pages of text. In this amount of space, it has been found that it is possible to meet the governmental labeling requirements for insecticides and other chemicals and to provide the necessary instructions.

The booklet label is one which can be readily understood and used by the consumer. There are no perforations to tear, or other obstructions to opening the booklet label. It is merely necessary to lift the front page of the booklet 71 by grasping the lower extremity of that page and separating it from the three glue dots 54 and then lifting the page to permit the consumer to read the intervening pages. After the consumer has finished reading the instructions, the front page 71 can be brought down into contact with the glue dots 54 to reseal the booklet. It has been found that the use of the three spaced apart glue dots is more than adequate to retain the booklet sealed, while still making it very easy for the customer to open the booklet whenever desired to read the instructions.

From the foregoing, it can be seen that a booklet label has been provided which can be made from a single sheet of paper with the paper being printed on both sides. The booklet label, since it is flat, can be readily stored before use. The addition of varnish to the exterior colored surface protects the booklet label from scuffing, which could occur during packing and shipment.

The resealable glue or adhesive that is utilized has a number of advantages. It permits a great number of reseals of the booklet label without the adhesive breaking down. In addition, there is not a tendency to tear the paper fiber when the booklet label is initially opened. The resealable adhesive has good characteristics and keeps the booklet shut even after multiple openings.

It has been found that a booklet label constructed in the manner in accordance with the present invention does not have a tendency to wrinkle or buckle in storage or during application of the label to the container.

What is claimed is:

1. A booklet label adapted to be formed from a single sheet of paper and be adhered to a container, said booklet label having a spine and having a plurality of folded sheet portions taken from said single sheet of paper folded along fold lines and means permanently securing together said label strips along the fold lines to form the spine and to provide first and last sheet portions and other sheet portions disposed between the first and last sheet portions, all of said first and second sheet portions and said other sheet portions extending to the spine, said first and last sheet portions having a length greater than the other sheet portions, resealable means disposed between the first and last sheet portions and beyond the other sheet portions for bonding the first sheet portion to the second sheet portion for holding the booklet in a closed position but permitting the booklet label to be opened.

2. A booklet label as in claim 1 wherein said last sheet is provided with a rear surface adapted to receive an adhesive for adhering the booklet label to the container.

3. A booklet label as in claim 1 wherein said resealable means is disposed between the first and last sheets and includes spaced apart dots of the resealable adhesive.

4. A sheet of paper to be formed into a booklet label, said sheet of paper having a rectangular configuration and having first and second sides with printing disposed on the first and second sides and having first and second spaced apart parallel edges and third and fourth spaced apart parallel edges extending in a direction at right angles to the first and second parallel edges, a first fold line extending from the first edge to the second edge generally equidistant between the third and fourth edges and a second fold line extending between the third and fourth edges and spaced between the first and second edges and extending at right angles to the first fold line, said first and second sides each having first, second, third and fourth quadrants with the printing being disposed in the quadrants, first and second cutouts formed in the sheet and extending inwardly from the third and fourth edges and extending from the second edge towards the first edge and extending through the second quadrant and partially into the first quadrant and into the fourth quadrant extending through the fourth quadrant and into a portion of the third quadrant.

5. A sheet as in claim 4 together with an additional cutout formed in the first edge spaced inwardly from the third edge and extending from the first edge to the first cutout.

6. A booklet label as in claim 1 wherein four sheet portions are provided with the four sheet portions being provided by two folded sheet portions folded along the fold line to provide first and second folds.

7. A booklet label as in claim 1 wherein said first sheet portion has an outer surface which is colored and wherein said last sheet portion has a portion which extends beyond the first sheet portion and wherein said portion of the last sheet portion has a color matching the color of the outer surface of the first sheet portion.

8. A sheet as in claim 4 wherein printing for the booklet label is provided on the first and second sides of the single sheet of paper.

* * * * *